United States Patent [19]

Fukuhara et al.

[11] 4,318,598
[45] Mar. 9, 1982

[54] AUTOMATIC FOCUSING DEVICE IN A CAMERA

[75] Inventors: Toru Fukuhara, Isehara; Akira Ogasawara, Yokohama; Makoto Kimura, Tokyo, all of Japan

[73] Assignee: Nippon Kogaku K.K., Tokyo, Japan

[21] Appl. No.: 104,849

[22] Filed: Dec. 18, 1979

[30] Foreign Application Priority Data

Dec. 29, 1978 [JP] Japan ................................ 53/163080

[51] Int. Cl.³ ............................................. G03B 13/18
[52] U.S. Cl. .................................... 354/23 D; 354/25; 354/198
[58] Field of Search ............... 354/23 D, 25, 195, 266, 354/198, 60 E, 60 L, 53, 25 A, 25 P, 31 F, 25 N, 25 R; 352/140; 355/56

[56] References Cited

U.S. PATENT DOCUMENTS

| | | | |
|---|---|---|---|
| 3,479,943 | 11/1969 | Goshima | 354/25 |
| 3,798,660 | 3/1974 | Hasegawa et al. | 354/25 |
| 3,941,996 | 3/1976 | Stauffer | 354/25 X |
| 4,178,087 | 12/1979 | Shenk et al. | 354/195 |

Primary Examiner—L. T. Hix
Assistant Examiner—William B. Perkey

Attorney, Agent, or Firm—Fitzpatrick, Cella, Harper & Scinto

[57] ABSTRACT

An automatic focusing device in a camera comprises drive means for moving a picture-taking lens in the direction of the optic axis so that the picture-taking lens can be focused to an object from the shortest distance to infinity, detector means having photoelectric converter means and adapted to emit a focus position signal when the image formation plane of the object by the picture-taking lens is not coincident with an optimal focusing plane and to emit a focusing signal when the image formation plane is substantially coincident with the optimal focusing plane, a shutter release operating button displaceable between a first operating position and a second operating position and adapted, when displaced to the second operating position, to release the shutter of the camera, trigger means adapted to emit an operating signal when the shutter release operating button is displaced to the first operating position, and means for controlling the drive means such that the picture-taking lens is moved in response to application of the focus position signal and the operating signal, that said movement of the lens is stopped in response to application of the operating signal and the focusing signal and that after the stoppage of the lens, said movement becomes possible only in response to re-application of the operating signal.

2 Claims, 7 Drawing Figures

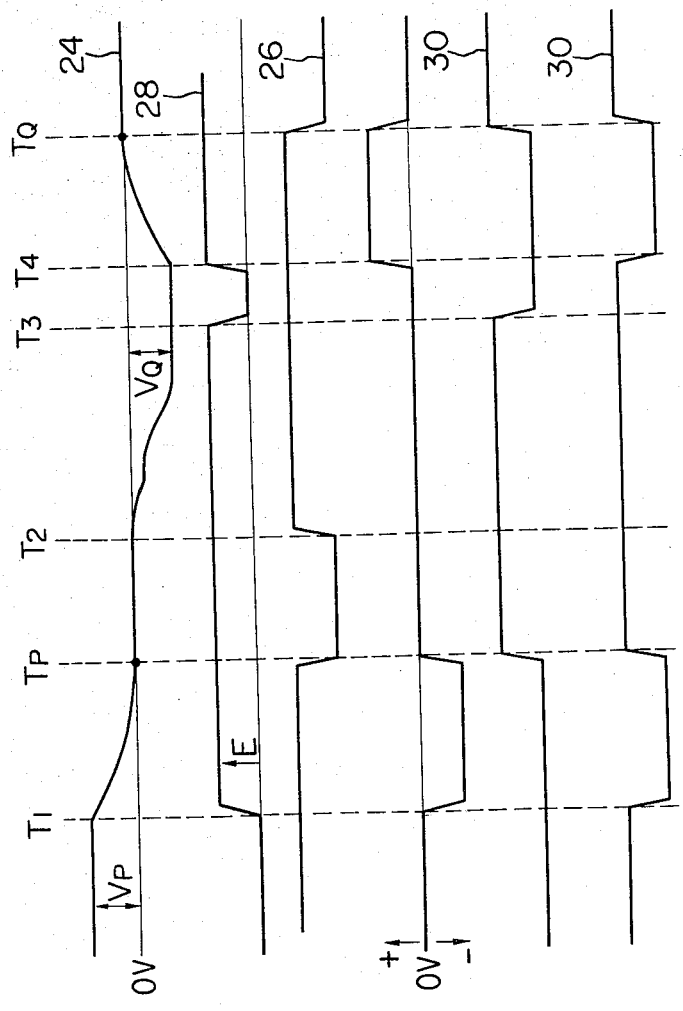

AUTOMATIC FOCUSING DEVICE IN A CAMERA

BACKGROUND OF THE INVENTION

1. Field of the Invention

This invention relates to an automatic focusing device in a camera.

2. Description of the Prior Art

In cameras of the type which include automatic focusing apparatus, a technique is known whereby a motor, controlled by the output of a focus detecting circuit, drives a picture-taking lens to a focused position, and upon completion of the focusing operation a return mirror is retracted from the finder light path as a result of a release operation. In response to such retraction, motor control is blocked in order to fix the position of the picture-taking lens, and such blocking is released in response to the return of the return mirror to its initial position after completion of exposure (see, for example, Japanese Laid-Open Utility Model Application No. 85234/1975).

Such prior art technique has a disadavantage in that the motor control is started immediately after the return of the return mirror to its initial position and thus, the motor is idly driven until new framing is effected, as a result of which the consumption of the driving current by the motor is increased.

SUMMARY OF THE INVENTION

We have conceived and contribute by the present invention an automatic focusing device which is particularly useful for a single lens reflex camera and which can minimize the amount of current consumed by the motor and which enables focus lock.

There has thus been outlined rather broadly the more important features of the invention in order that the detailed description thereof that follows may be better understood and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings, forming a part of the specification wherein:

FIGS. 7A to 7F are timing charts showing the operative conditions of the first embodiment.

DESCRIPTION OF THE PREFERRED EMBODIMENTS

Figure 1:
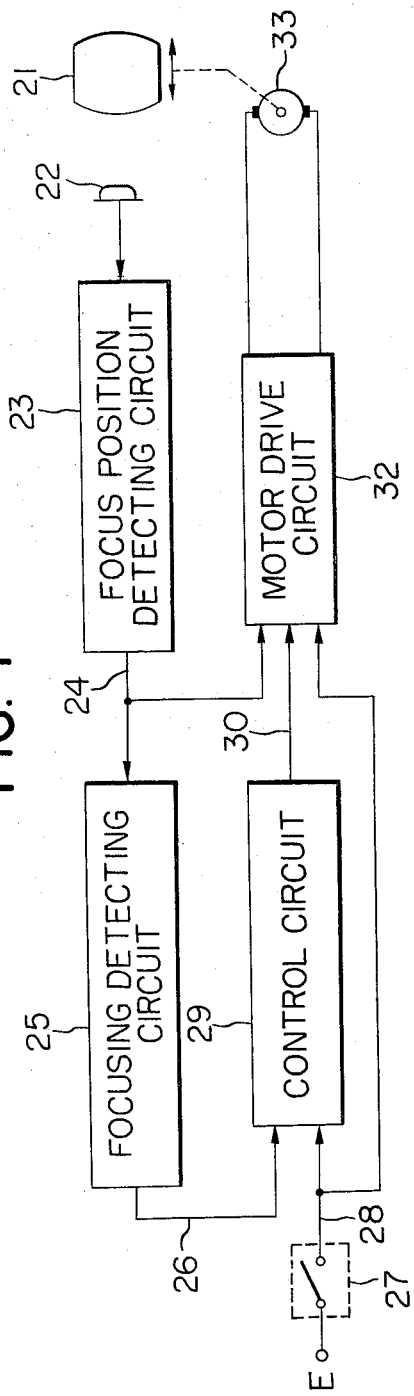
FIG. 1 is a block diagram showing a first embodiment of the present invention.

The present invention will be described in greater detail with reference to an embodiment thereof shown in FIG. 1.

A picture-taking lens 21 may be driven by the driving of a motor 33 in the direction of the optic axis so as to be focused to objects from the shortest distance to infinity. The optical signal of an object image passed through the picture-taking lens 21 is directed to a photoelectric converter 22, by which it is converted into an electrical signal which is applied to a focus position detecting circuit 23. The photoelectric converter 22 and the focus position detecting circuit 23 are set so as to emit an electrical signal for discriminating whether the image formation plane of the object image passing through the picture-taking lens 21 lies forwardly or rearwardly of an optimal focusing plane, such as the film surface. According to such a device, when the image formation plane of the picture-taking lens is coincident with an optimal focusing plane, a zero DC voltage is emitted and when the image formation plane lies forwardly or rearwardly of the optimal focus plane, a DC voltage of the opposite polarity is emitted to discriminate the difference between the image formation plane and the optimal focusing plane. The focus position detecting circuit 23 emits the above-described DC voltage as a focus position signal 24 to a focus detecting circuit 25 and a motor drive circuit 32. The focusing detecting circuit 25 detects an optimal focusing position from the focus position signal 24 and emits a focusing signal 26. At the same time, the focus position signal 24 applied to the motor drive circuit 32 is used to determine the direction of rotation of the motor 33 by the polarity of the DC voltage thereof.

On the other hand, the focusing signal 26 is applied to a control circuit 29 with an operating signal 28 which is a predetermined voltage E generated from a switch 27 adapted to be closed in response to displacement of a shutter release operating button, not shown, to a first operating position, for example, half-depression of such button. Once the focusing signal 26 is applied while the operating signal 28 is being applied, the control circuit 29 continues to emit a stop signal 30 for as long as the operating signal 28 is being applied. The motor drive circuit 32 receives as inputs the focus position signal 24 and the stop signal 30 and controls the power supply to a motor 33 so that the direction of rotation of the motor can be reversed in accordance with the polarity of the DC voltage of the focus position signal 24 and that the motor 33 may be stopped by the stop signal 30. The driving and stoppage of the motor 33 accomplish the movement and retention of the picture-taking lens 21 in the direction of the optic axis by the use of transmission means, not shown.

Figure 2:
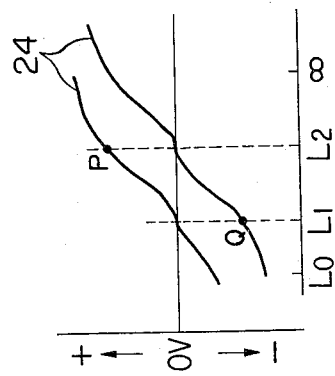
FIG. 2 illustrates the relation between the focal length and focus position signal 24 in FIG. 1.

FIG. 2 simply shows the condition of the DC voltage of the focus position signal 24. If the object lies at a distance $L_1$, when the focus of the picture-taking lens is moved from the shortest distance $L_0$ to the infinity distance $\infty$, the optical signal detected by the photoelectric converter 22 is converted to the focus position signal 24, as shown by curve (a) in FIG. 2, by the focus position detecting circuit 23. Likewise, when the object lies at a distance $L_2$, the optical signal is converted to the focus signal 24, as shown by curve (b) in FIG. 2. As is apparent from FIG. 2, the focus position signal 24 is 0 volt at the focusing point $L_1$ or $L_2$. Therefore, in order to know whether or not the focusing point has been reached, it is most suitable to use a discriminator, a comparator, or the like, which detects that voltage of the focus position signal 24 has beome 0.

Figure 3:
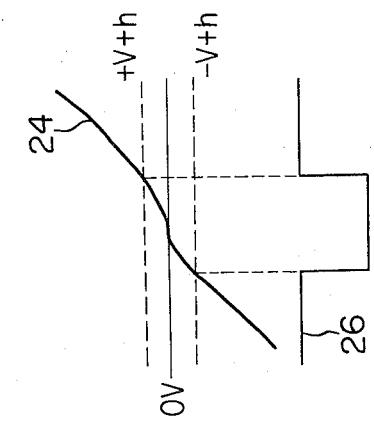
FIG. 3 illustrates the relation between the focus position signal 24 and focusing signal 26 in FIG. 2.

FIG. 3 shows the manner in which the focusing point is detected. The vicinity of 0 volts of the focusposition signal 24 is discriminated by the use of a window comparator. The threshold voltage $\pm V_{th}$ sets up an insensitive zone for positively judging that the voltage of focus position signal 24 has become approximately 0.

Figure 4:
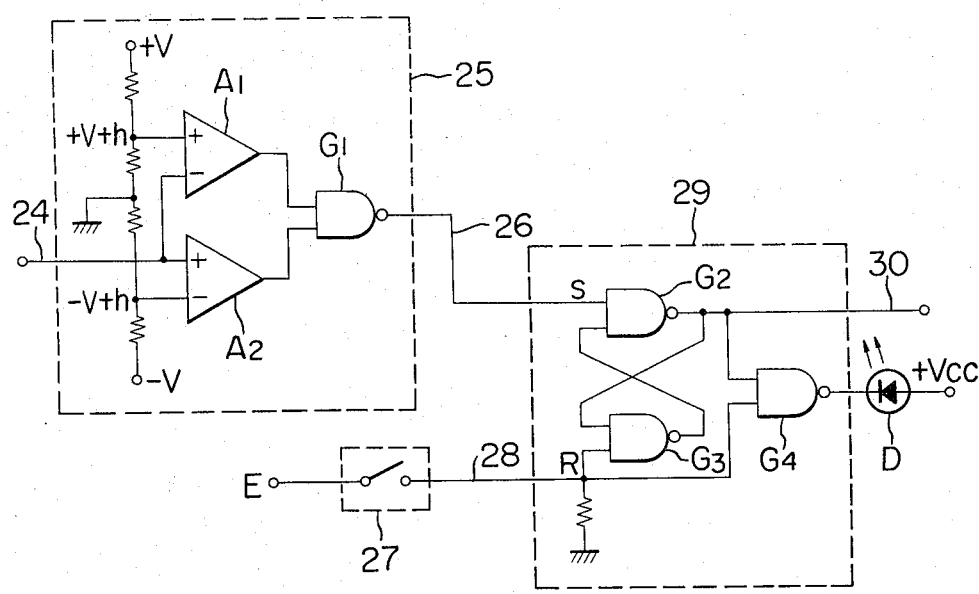
FIG. 4 shows the circuit connection of a focus detecting circuit 25 and control circuit 29 in FIG. 1.

FIG. 4 shows circuit connections of the focusing detecting circuit 25 and control circuit 29. The focusing detecting circuit 25, forming a window comparator, comprises operational amplifiers $A_1$ and $A_2$ operable as comparators, and a NAND gate element $G_1$. Four resistors connected between the positive power source and the negative power source through an earth point determine the threshold voltage $\pm V_{th}$ in the vicinity of 0 volts. The focus position signal 24 is commonly applied to the operational amplifiers $A_1$ and $A_2$ and, when the voltage of the focus position signal 24 exists between the two threshold voltages $+V_{th}$ and $-V_{th}$, both outputs of the operational amplifiers $A_1$ and $A_2$ assume "H" level and through the NAND gate element $G_1$, the focusing signal 26 which is the output thereof assumes "L" level. Accordingly, the focusing detecting circuit 25 puts out the focusing signal 26 as shown in FIG. 3. The logic level of the focusing signal 26 during the focusing may be "H" level in accordance with the subsequent treatment of the focusing signal 26. The control circuit 29 comprises an R-S flip-flop circuit provided by NAND gate elements $G_2$ and $G_3$, and NAND gate element $G_4$ for driving a light-emitting diode which displays the focusing. The focusing signal 26 is applied to the set input S of the NAND gate element $G_2$. On the other hand, the predetermined voltage E is applied as an operating signal 28 to the reset input R of the NAND gate element $G_3$ and to the NAND gate element $G_4$ by a switch 27 adapted to be closed in response to half-depression of the shutter release operating button. A resistor connected between the reset input R of the NAND gate element $G_3$ and the earth serves always to maintain the reset input R at "L" level when the switch 27 is open. The switch 27 conducts the predetermined voltage E and therefore, it may be replaced by another trigger means for example, a one-shot multivibrator having the same function. The control circuit 29, constructed as described above, obtains a stop signal 30 from the NAND gate element $G_2$. A light-emitting diode D, connected between the output of the NAND gate element $G_4$, to which are applied the operating signal 28 and the stop signal 30 and the power source may be turned on to display the accomplishment of the focusing.

Figure 5:
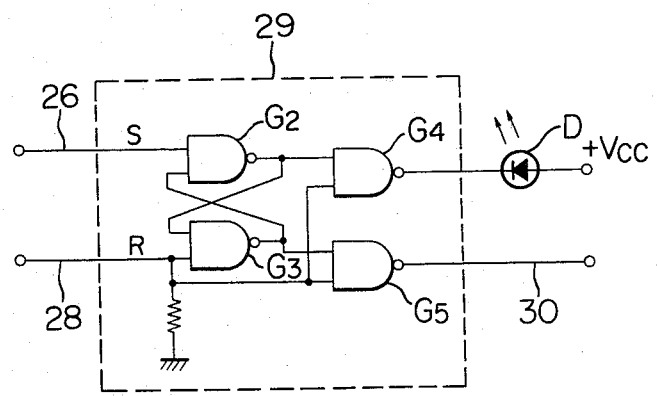
FIG. 5 shows the circuit connection of the control circuit 29 according to a second embodiment of the present invention.
Figure 6:
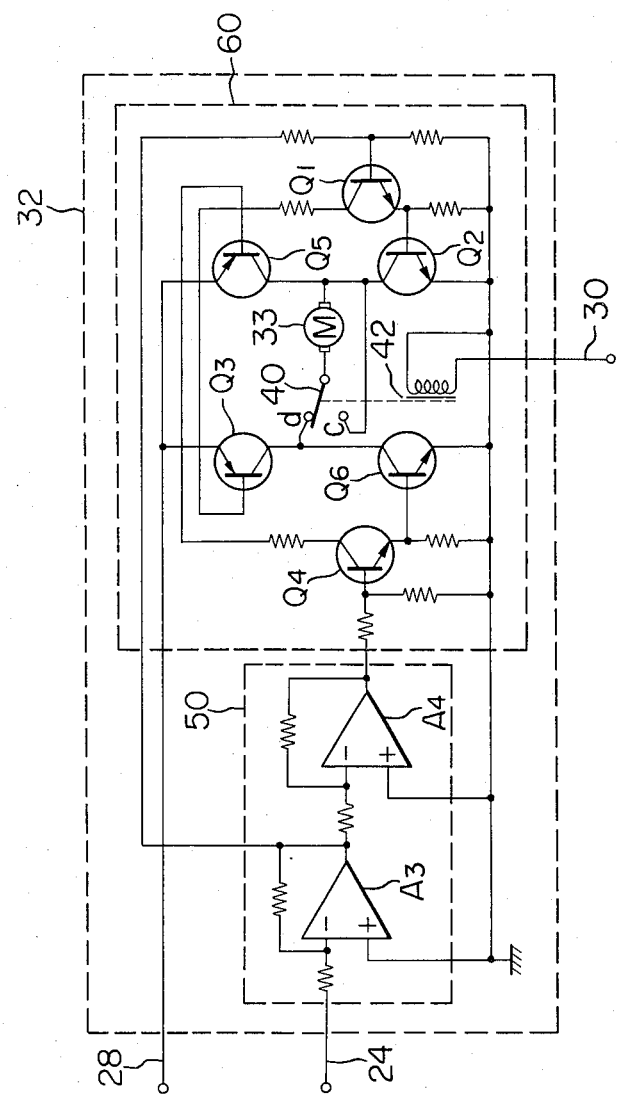
FIG. 6 shows the circuit connection of the motor drive circuit 32 of FIG. 1.

The operating signal 28 and the stop signal 30 provide the input to a motor drive circuit 32 shown in FIG. 6. The motor drive circuit 32 inludes an amplifying portion 50 and a driving portion 60. The amplifying portion 50 comprises inversion amplifiers which are operational amplifiers $A_3$ and $A_4$ connected in two stages. The output of the first step operational amplifier $A_3$ is connected to a transistor $Q_1$ through a resistor, and the output of the next stage operational amplifier $A_4$ is connected to a transistor $Q_4$ through a resistor. Four transistors $Q_2$, $Q_3$, $Q_5$ and $Q_6$ bridge-connected, including a motor 33, effect normal and reverse rotations of the motor 33 by a single source voltage. A relay 42 has a switch 40 normally connected to the contact d side which is connected to the motor 33. When the stop signal 30 assumes "H" level, a coil of the relay 42 is energized to shift the switch 40 to the contact c side. From the foregoing description of FIGS. 4 and 6, it is seen that the operating signal 28 is the predetermined voltage E and this voltage also serves as the source voltage for the driving portion 60 of the motor drive circit 32. However, where this predetermined voltage E is not used also as such source voltage, the input terminal for the source voltage of the driving portion 60 is connected to a separate power source for driving the motor. In the case of such construction, the control circuit 29 may be such as is shown in FIG. 5.

In the circuit connection of FIG. 5, the stop signal 30 is obtained from the output of a NAND gate element $G_5$ to which are applied the output signal of the NAND gate element $G_3$ of R-S flip-flop and the operating signal 28. The ligh-emitting diode D performs the same function as that of the circuit connection of FIG. 4. Further, the amplifying portion of FIG. 6 may also be constructed by using two comparators, namely, a comparator which emits "H" level for the positive voltage of the focus position signal 24 and a comparator which emits "H" level for the negative voltage of the focus position signal 24. If the source voltages for the focus position detecting circuit 23, the focusing detecting circuit 25, and the control circuit 29 of FIG. 1 are supplied only during the output of the operating signal 28, the consumed current will be further reduced.

The condition of each signal and the automatic focusing operation will now be described by reference to FIG. 7. It is assumed that the distance to the object is, for example, $L_2$ shown in FIG. 2 and that the picture-taking lens 21 is in its focused condition at $L_1$ which is a distance shorter than the distance $L_2$. The focus position detecting circuit 23 generates, as shown in FIG. 7(A), a voltage Vp of the positive polarity as the focus position signal 24, corresponding to point P on the curve (a) of FIG. 2. This focus signal 24 is applied to the focusing detecting circuit 25 and the motor drive circuit 32. At this time, the focusing detecting circuit 25 emits a focusing signal 26 of "H" level as shown in FIG. 7(C). Further, as the initial state of the R-S flip-flop circuit included in the control circuit 29, the reset input R is at "L" level and the set input S is at "H" level, and the output of the NAND gate element $G_2$, namely, the stop signal 30, assumes "L" level. The output of the NAND gate element $G_5$ of FIG. 5 is at "H" level.

In FIG. 7, half-depression of the shutter release operating button is effected at time $T_1$. Thereupon, as shown in FIG. 7(B), the logic level of the operating signal 28 changes from "L" to "H" level. Accordingly, the predetermined voltage E is supplied to the driving portion 60. As previously described, the focus position signal 24 is a voltage of the positive polarity and so, the output of the operational amplifier $A_3$ of the amplifying portion 50 shown in FIG. 6 assumes the negative polarity and the output of the operational amplifier $A_4$ assumes the positive polarity. Consequently, by the output voltage of the operational amplifier $A_4$, the transistor $Q_4$ conducts and simultaneously therewith, the transistors $Q_5$ and $Q_6$ also conduct, so that the motor 33 is supplied with the current from the transistor $Q_5$ to the transistor $Q_6$ as shown in FIG. 7(D) and starts to drive. This drive effects movement of the picture-taking lens 21 in the direction of the optic axis and changes the focal length from $L_1$ toward $L_2$ in FIG. 2. With the variation in focal length of the picture-taking lens 21, the voltage Vp of the focus position signal 24 falls as shown in FIG. 7(A) and becomes approximately 0 volt at time Tp. The focusing detecting circuit 25 detects the approximately 0 voltage of the focus position signal 24 and renders the focusing signal 26 from "H" level to "L" level as shown in FIG. 7(C). This change of the logic level of the focusing signal 26 inverts the initial output condition of the R-S flip-flop circuit of the control circuit 29 and the stop signal 30 changes from "L" level to "H" level as shown in FIG. 7(D). Consequently, the coil of the relay 42 provided in the driving portion 60 is energized and the movable contact of the switch 40 changes over from the d side to the c side to apply dynamic braking to the motor 33. Accordingly, at time Tp, the picture-taking lens 21 is stopped from moving in the direction of the optic axis and is retained at the focal length $L_2$. Here, the operating signal 28 is at "H" level and the stop signal 30 is also at "H" level and therefore, the output of the NAND gate element $G_4$ assumes "L" level to turn on the light-emitting diode D, which thus displays the accomplishment of the focusing. It is assumed that, thereafter, at time $T_2$, the framing is changed with the shutter release operating button remaining half-depressed and an object at the distance $L_1$ in FIG. 2 has been caught, the focus position signal 24, as shown in FIG. 7(A), becomes a voltage $V_Q$ of the negative polarity corresponding to a point Q on the curve (b) of FIG. 2, and simultaneously therewith, the focusing signal 26, as shown in FIG. 7(C), changes from "L" level to "H" level, from the point of time whereat the framing has been changed at time $T_2$. However, due to the condition holding function of the R-S flip-flop circuit, the variation in the then focusing signal 26 does not vary the condition of the stop signal 30, which thus remains at "H" level as shown in FIG. 7(E). Accordingly, the power supply to the motor 33 continues to be stopped and thus, the focus lock can be accomplished. If the half-depression of the shutter release operating button takes place during this framing, the light-emitting diode D will continue to be turned on.

Next, at time $T_3$, the half-depression is released. At this point of time, both the operating signal 28 and the stop signal 30 come to assume "L" level. Accordingly, the coil of the relay 42 becomes deenergized and the movable contact of the switch 40 becomes connected to the d side while at the same time the light emitting diode D becomes turned off. Further, at time $T_4$, the shutter release operating button is again half-depressed. At this time, the difference from the aforementioned operation is that the direction of current supply to the motor 33 is reversed. More specifically, since the focus position signal 24 is a voltage $V_Q$ of the negative polarity, the output voltage of the first stage operational amplifier $A_3$ of the amplifying portion 60 is of positive polarity and the output voltage of the next stage operational amplifier $A_4$ is of the negative polarity. Thus, conversely to the aforementioned operation, the transistor $Q_1$ conducts by the output voltage of the operational amplifier $A_3$ and consequently, the transistors $Q_2$ and $Q_3$ also conduct. The current supply to the motor 33 takes place from the transistor $Q_3$ to the transistor $Q_2$ and the current flows in the opposite direction to that during the aforementioned operation, as shown in FIG. 7(D). By this, the picture-taking lens 21 is moved in the opposite direction to the aforementioned movement in the direction of the optic axis, that is, it changes its focal length so that it is focused to the object at the distance $L_1$ from the object at the distance $L_2$.

Further, at time $T_Q$, when the focusing to the distance $L_1$ is accomplished, the light-emitting diode D is likewise turned on and the focus lock takes place. In this manner, the light-emitting diode D is turned on during the focus lock which takes place during the half-depression of the shutter release operating button.

Also, where the control circuit 29 is constructed as shown in FIG. 5, the stop signal 30 is obtained from the output of the NAND gate element $G_5$ and therefore, as shown in FIG. 7(F), it always assumed "H" level except when the motor 33 must be driven.

We believe that the construction and operation of our novel automatic focusing device will now be understood and that the several advantages thereof will be fully appreciated by those persons skilled in the art.

We claim:

1. In an automatic focusing device in a camera comprising:

photo electric means for receiving light from an object to be photographed and passed through a picture-taking lens;

focusing position detecting means for detecting in-focus and out-of-focus directons of the picture-taking lens and producing an output signal representative of a focusing position of the picture-taking lens;

a motor for driving the picture-taking lens in the direction of the optical axis; and control means for energizing the motor when said focusing position signal is representative of out-of-focus and for stopping the motor when the focusing position signal is representative of in-focus, the improvement comprising:

(a) focusing detecting means to which said focusing position signal is applied and which produces an in-focus signal when substantial in-focus is detected;

(b) switch means for producing a trigger signal for initiating energization of the motor in association with depression of a shutter release button of the camera;

(c) a circuit for producing a signal for stopping the motor from the reception of the in-focusing signal; and (d) means for displaying the in-focus condition of the picture-taking lens during the reception of both said trigger signal and the stopping signal from the circuit.

2. A device according to claim 1, wherein the signal producing circuit is a flip-flop circuit.

* * * * *